United States Patent Office 2,906,759
Patented Sept. 29, 1959

2,906,759

PROCESS OF PREPARING 11$\beta$,17$\beta$-DIHYDROXY-17$\alpha$-ETHYNYL-$\Delta^{1,4}$-ANDROSTADIENE-3-ONE Georges Muller, Nogent sur Marne, France, and Andreas Furlenmeier, Basel, Switzerland, assignors to Les Laboratoires Francais de Chimiotherapie, Paris, France, a corporation of France No Drawing. Application November 25, 1958
Serial No. 776,178

Claims priority, application France November 29, 1957

1 Claim. (Cl. 260—397.45)

The present invention relates to an improved process of preparing 11$\beta$,17$\beta$-dihydroxy-17$\alpha$-ethynyl-$\Delta^{1,4}$-androstadiene-3-one.

11 - keto - 17$\alpha$ - ethynyl - $\Delta^{1,4}$ - androstadiene - 17$\beta$ - ol-3-one has been converted into 11$\beta$,17$\beta$-dihydroxy-17$\alpha$-ethynyl-$\Delta^{1,4}$-androstadiene-3-one by way of its 3-semicarbazone. By reducing the 11-keto group of said 3-semicarbazone compound to a secondary alcohol group by means of an alkali metal boronhydride and hydrolysis of the reduction product, the desired 11$\beta$,17$\beta$-dihydroxy-17$\alpha$-ethynyl-$\Delta^{1,4}$-androstadiene-3-one is obtained.

It is one object of the present invention to provide an improved process for producing 11$\beta$,17$\beta$-dihydroxy-17$\alpha$-ethynyl-$\Delta^{1,4}$-androstadiene-3-one.

Other objects of the present invention and advantageous features thereof will become apparent as the description proceeds.

In principle, the process according to the present invention consists in selectively ethynylating, in 17-position, 11$\beta$-hydroxy-$\Delta^{1,4}$-androstadiene-3,17-dione without protection of the 3-keto group. The starting material can easily be prepared according to Hershberg et al., J. Am. Chem. Soc., 1955, vol. 77, page 4781, by treating $\Delta^1$-dehydrocortisol with sodium bismuthate.

That said 11$\beta$-hydroxy-$\Delta^{1,4}$-androstadiene-3,17-dione can selectively be ethynylated according to the present invention is quite surprising in view of the fact that, in general, 11$\beta$-hydroxy steroid compounds turn completely insoluble during ethynylation and do not react with potassium acetylide. This is especially so when carrying out the reaction at a very low temperature in liquid ammonia. However, when proceeding according to the present invention, these disadvantages are avoided and selective ethynylation without preliminary protection of the 3-keto group takes place.

The following example serves to illustrate the present invention without, however, limiting the same thereto.

EXAMPLE

Preparation of 11$\beta$,17$\beta$ - dihydroxy - 17$\alpha$ - ethnyl $\Delta^{1,4}$-androstadiene-3-one by selective ethynylation of 11$\beta$-hydroxy - $\Delta^{1,4}$ - androstadiene - 3,17 - dione ($\Delta^1$ - dehydro hydroadrenosterone)

1 g. of 11$\beta$-hydroxy-$\Delta^{1,4}$-androstadiene-3,17-dione are dissolved in 70 cc. of dioxane. To the resulting solution there are added 20 cc. of a solution of potassium acetylide prepared by dissolving 950 g. of potassium metal in 12 l. of tertiary amyl alcohol and 3.3 l. of benzene and saturating said solution with acetylene. The reaction mixture immediately turns red and a precipitate is formed. A stream of acetylene is passed through the mixture for 3 hours. Thereafter, the reaction mixture is cooled in an ice bath and is neutralized by the addition of acetic acid. 300 cc. of water are added and the mixture is extracted with chloroform. The combined chloroform extracts are washed with water, dried over magnesium sulfate, and evaporated to dryness. The residue is taken up with ethyl acetate whereupon crystallization takes place. 566 mg. of the desired compound are obtained. It has a melting point of 280° C. and a rotatory power of $[\alpha]_D^{20}$=0 (concentration: 0.5% in dioxane). The compound is identical with the previously described compound.

We claim:

In a process of producing 11$\beta$,17$\beta$-dihydroxy-17$\alpha$-ethynyl-$\Delta^{1,4}$-androstadiene-3-one, the steps comprising adding a solution of potassium acetylide in tertiary amyl alcohol and benzene to a solution of 11$\beta$-hydroxy-$\Delta^{1,4}$-androstadiene-3,17-dione in dioxane, passing acetylene at room temperature through the reaction mixture until ethynylation is completed, and isolating the resulting 11$\beta$,17$\beta$ - dihydroxy - 17$\alpha$ - ethynyl - $\Delta^{1,4}$ - androstadiene-3-one from the reaction mixture.

References Cited in the file of this patent

UNITED STATES PATENTS

| | | |
|---|---|---|
| 2,816,121 | Gould et al. | Dec. 10, 1957 |
| 2,864,830 | Agnello et al. | Dec. 16, 1958 |